(12) United States Patent
Geiser et al.

(10) Patent No.: US 10,753,408 B2
(45) Date of Patent: Aug. 25, 2020

(54) SWITCHABLE ONE-WAY CLUTCH

(71) Applicant: Schaeffler Technologies AG & Co. KG, Herzogenaurach (DE)

(72) Inventors: Jordan Geiser, Dalton, OH (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 292 days.

(21) Appl. No.: 15/867,444

(22) Filed: Jan. 10, 2018

(65) Prior Publication Data

US 2018/0231071 A1    Aug. 16, 2018

Related U.S. Application Data

(60) Provisional application No. 62/459,015, filed on Feb. 14, 2017.

(51) Int. Cl.
| F16D 41/08 | (2006.01) |
| F16D 41/06 | (2006.01) |
| F16D 27/02 | (2006.01) |
| F16D 41/04 | (2006.01) |
| F16D 41/067 | (2006.01) |
| F16D 27/00 | (2006.01) |

(52) U.S. Cl.
CPC .......... *F16D 41/088* (2013.01); *F16D 27/00* (2013.01); *F16D 27/02* (2013.01); *F16D 41/04* (2013.01); *F16D 41/067* (2013.01); *F16D 2041/0605* (2013.01)

(58) Field of Classification Search
None
See application file for complete search history.

(56) References Cited

U.S. PATENT DOCUMENTS

| 5,971,123 A | 10/1999 | Ochab et al. |
| 6,622,837 B2 | 9/2003 | Ochab et al. |
| 6,629,590 B2 | 10/2003 | Ochab et al. |

(Continued)

FOREIGN PATENT DOCUMENTS

| WO | 2002/40891 A2 | 5/2002 |
| WO | 2004/031597 A1 | 4/2004 |

(Continued)

*Primary Examiner* — Colby M Hansen
(74) *Attorney, Agent, or Firm* — Reid Baldwin

(57) ABSTRACT

A switchable one-way clutch includes an outer race, an inner race, a plurality of rollers, and a drag plate. The outer race has a ramped inner surface. The rollers are contactable with the outer race and the inner race. The cage is for positioning the plurality of rollers. The drag plate is rotationally engaged with the cage and frictionally engageable with the inner race. In an example embodiment, the cage has a notch and the drag plate has a tab installed in the notch to engage the drag plate to the cage. In an example embodiment, the drag plate or the inner race includes a friction material ring bonded thereto for increasing a friction coefficient between the drag plate and the inner race. In an example embodiment, the clutch has an arc spring. The outer race includes a pocket, the cage includes a tab, and the arc spring contacts the pocket and the tab to displace the cage in a first rotational direction. In an example embodiment, the inner race includes an inner splined surface.

20 Claims, 7 Drawing Sheets

(56) References Cited

U.S. PATENT DOCUMENTS

| | | |
|---|---|---|
| 6,722,484 B2 | 4/2004 | Ochab et al. |
| 8,840,514 B1 | 9/2014 | Knickerbocker et al. |
| 8,857,294 B2 | 10/2014 | Brewer et al. |
| 8,857,589 B2 | 10/2014 | Heath et al. |
| 8,919,513 B2 | 12/2014 | Heath et al. |
| 9,022,195 B2 | 5/2015 | Heath et al. |
| 9,360,059 B2 | 6/2016 | Palmer et al. |
| 9,482,294 B2* | 11/2016 | Kimes .................. F16D 41/125 |
| 2002/0125095 A1 | 9/2002 | Ochab et al. |
| 2002/0125097 A1 | 9/2002 | Ochab et al. |
| 2003/0019708 A1* | 1/2003 | Goto ..................... F16D 27/108 |
| | | 192/35 |
| 2003/0089570 A1 | 5/2003 | Ochab et al. |
| 2004/0110594 A1* | 6/2004 | Goto ....................... F16H 48/16 |
| | | 475/150 |
| 2010/0140041 A1* | 6/2010 | Wittkopp .............. F16D 41/185 |
| | | 192/66.32 |
| 2010/0314213 A1* | 12/2010 | Joki ..................... F16D 41/086 |
| | | 192/82 R |
| 2012/0152686 A1 | 6/2012 | Brewer et al. |
| 2013/0112520 A1 | 5/2013 | Heath et al. |
| 2013/0134006 A1 | 5/2013 | Heath et al. |
| 2013/0199886 A1 | 8/2013 | Heath et al. |
| 2014/0274530 A1 | 9/2014 | Knickerbocker et al. |
| 2015/0159743 A1 | 6/2015 | Palmer et al. |

FOREIGN PATENT DOCUMENTS

| | | |
|---|---|---|
| WO | 2013/082168 A1 | 6/2013 |
| WO | 2014/143090 A1 | 9/2014 |
| WO | 2014/159651 A1 | 10/2014 |

* cited by examiner

SWITCHABLE ONE-WAY CLUTCH

FIELD

The invention relates generally to a one-way clutch, and more specifically to a switchable one-way clutch.

BACKGROUND

Switchable one-way clutches are known. One example is shown in commonly assigned U.S. patent application Ser. No. 62/452,475, hereby incorporated by reference as if set forth fully herein.

BRIEF SUMMARY

Example aspects broadly comprise a switchable one-way clutch including an outer race, an inner race, a plurality of rollers, and a drag plate. The outer race has a ramped inner surface. The rollers are contactable with the outer race and the inner race. The cage is for positioning the plurality of rollers. The drag plate is rotationally engaged with the cage and frictionally engageable with the inner race. In an example embodiment, the cage has a notch and the drag plate has a tab installed in the notch to engage the drag plate to the cage. In an example embodiment, the drag plate or the inner race includes a friction material ring bonded thereto for increasing a friction coefficient between the drag plate and the inner race. In an example embodiment, the clutch has an arc spring. The outer race includes a pocket, the cage includes a tab, and the arc spring contacts the pocket and the tab to displace the cage in a first rotational direction. In an example embodiment, the inner race includes an inner splined surface.

In some example embodiments, the clutch has a piston for frictionally engaging the drag plate with the inner race to displace the cage and lock the clutch. In an example embodiment, the clutch has a first disk spring disposed between the piston and the drag plate. In some example embodiments, the clutch has a housing. The outer race is fixed in the housing and the piston is sealed to the housing. In some example embodiments, the clutch has a first retaining ring installed in the housing for limiting an axial travel of the piston towards the drag plate. In some example embodiments, the clutch has a second retaining ring installed in the housing and a second disk spring contacting the piston and the second retaining ring for displacing the piston away from the drag plate. In an example embodiment, the housing has a fluid channel for flowing a pressurized fluid to displace the piston towards the drag plate and displacement of the piston compresses the first disk spring against the drag plate to frictionally engage the drag plate with the inner race.

In some example embodiments, the clutch has an electromagnet for frictionally engaging the drag plate with the inner race to displace the cage in a second rotational direction to lock the clutch. In some example embodiments, the clutch has a housing. The electromagnet is fixed to the housing. In an example embodiment, the drag plate is disposed axially between the housing and the electromagnet.

Other example aspects broadly comprise a switchable one-way clutch assembly with an outer race including a ramped inner surface, an inner race including an inner splined surface, and a plurality of rollers. For a first mode of the clutch, the inner race is rotatable relative to the outer race in a first rotational direction and locks to the outer race in a second opposite rotational direction. For a second mode of the clutch, the inner race locks to the outer race in the first rotational direction and the second opposite rotational direction. In an example embodiment, the clutch has a housing. The outer race is fixed in the housing. In some example embodiments, the clutch has a drag plate. Switching from the first mode of the clutch to the second mode of the clutch includes frictionally engaging the drag plate to the inner race.

In some example embodiments, the clutch has a comprising piston for frictionally engaging the drag plate to the inner race. In an example embodiment, the piston is actuated by a fluid pressure and released by a disk spring. In an example embodiment, the clutch has an electromagnet for frictionally engaging the drag plate to the inner race.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
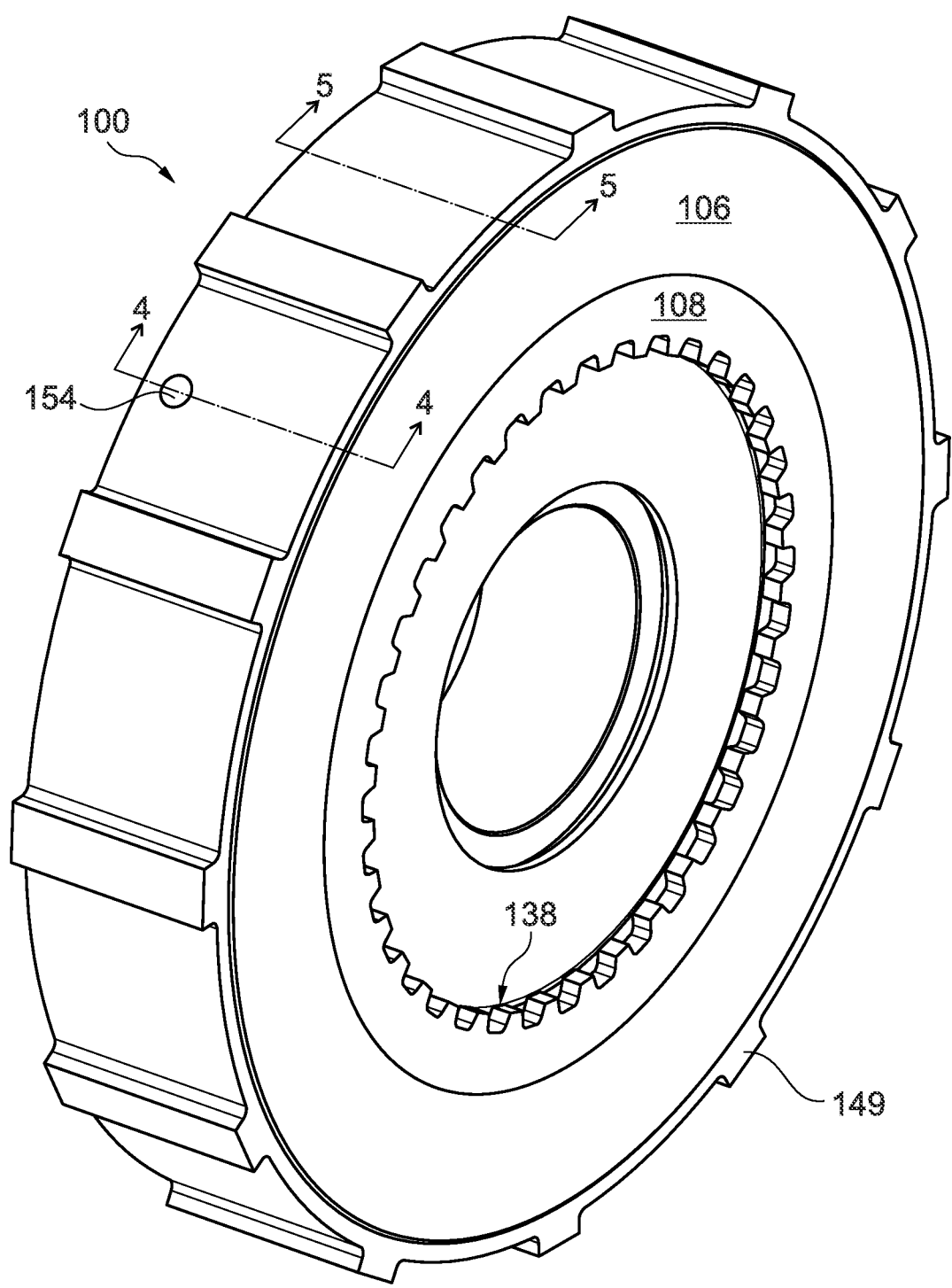
FIG. 1 is a front perspective view of a switchable one-way clutch according to an example aspect.
Figure 2:
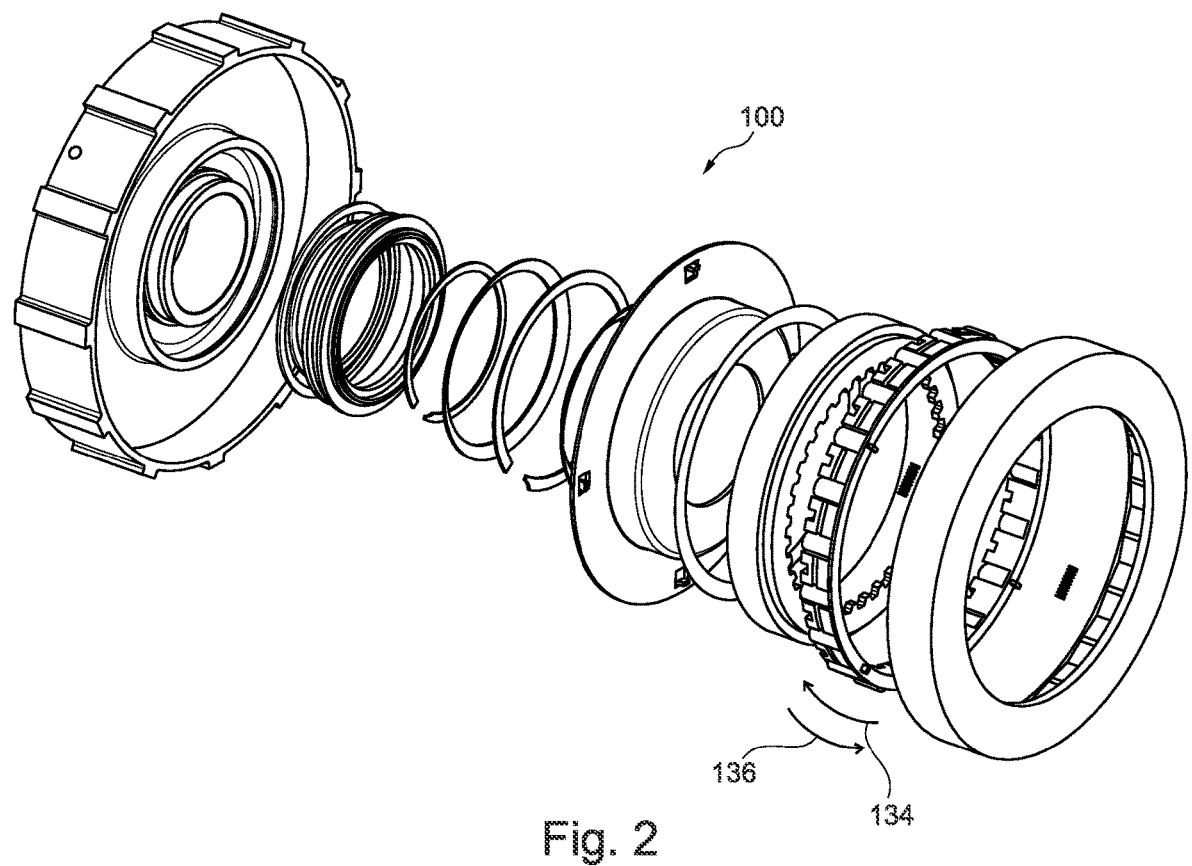
FIG. 2 is a front exploded perspective view of the clutch of FIG. 1.
Figure 3:
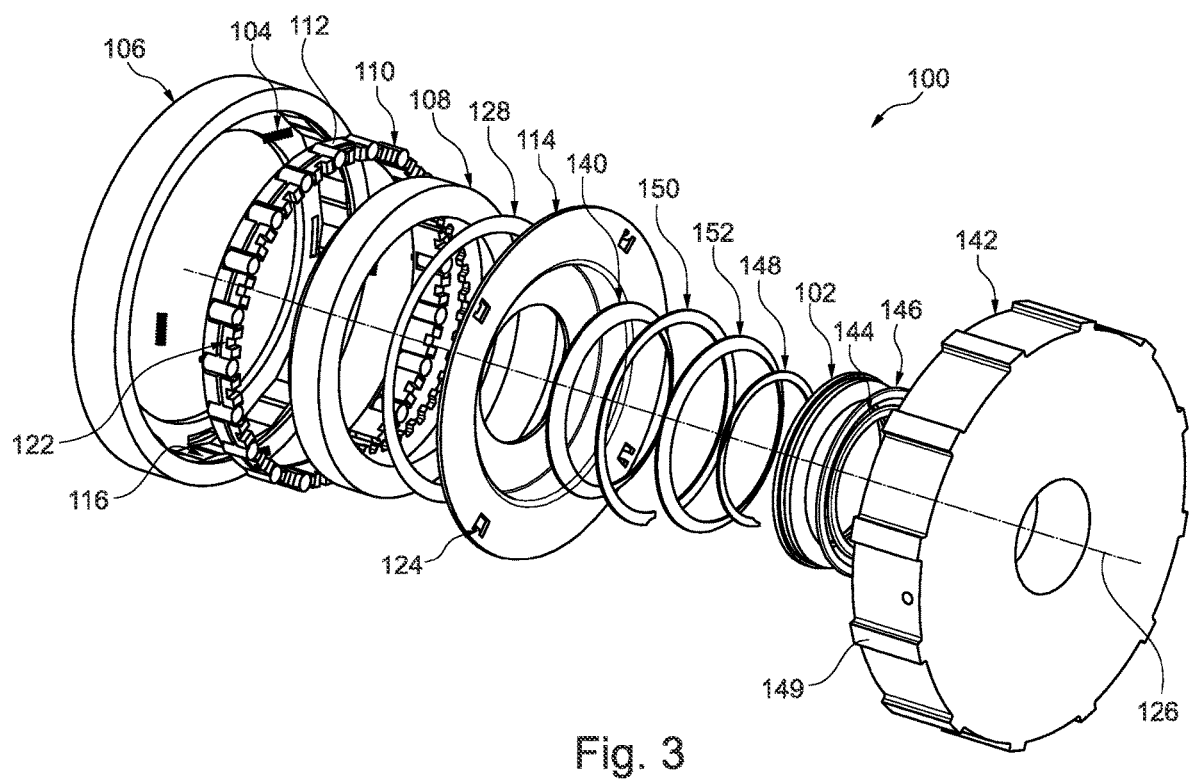
FIG. 3 is a back exploded perspective view of the clutch of FIG. 1.
Figure 4:
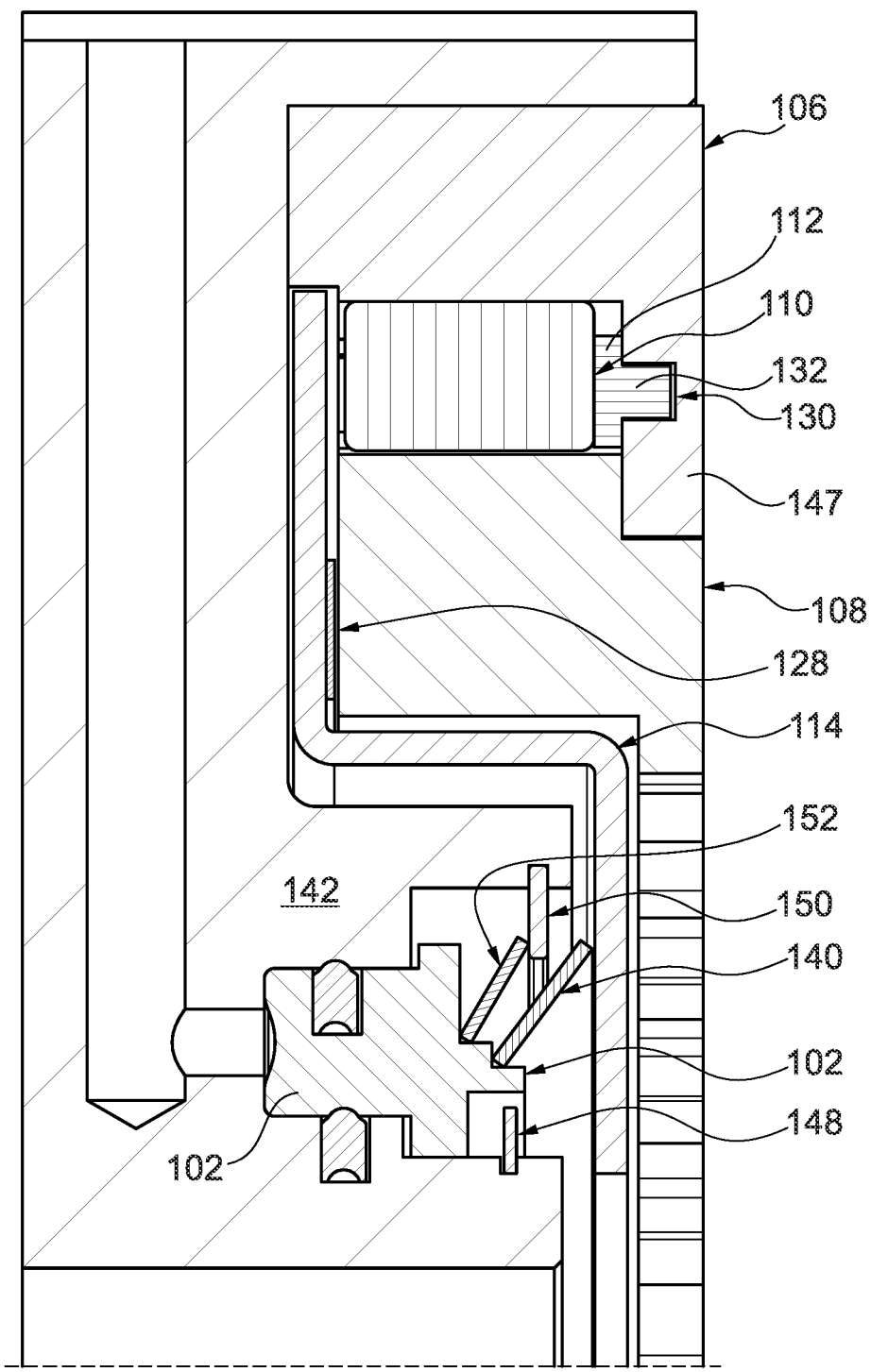
FIG. 4 is a partial section view of the clutch of FIG. 1 taken generally along line 4-4 in FIG. 1 showing a piston in a release state.
Figure 5:
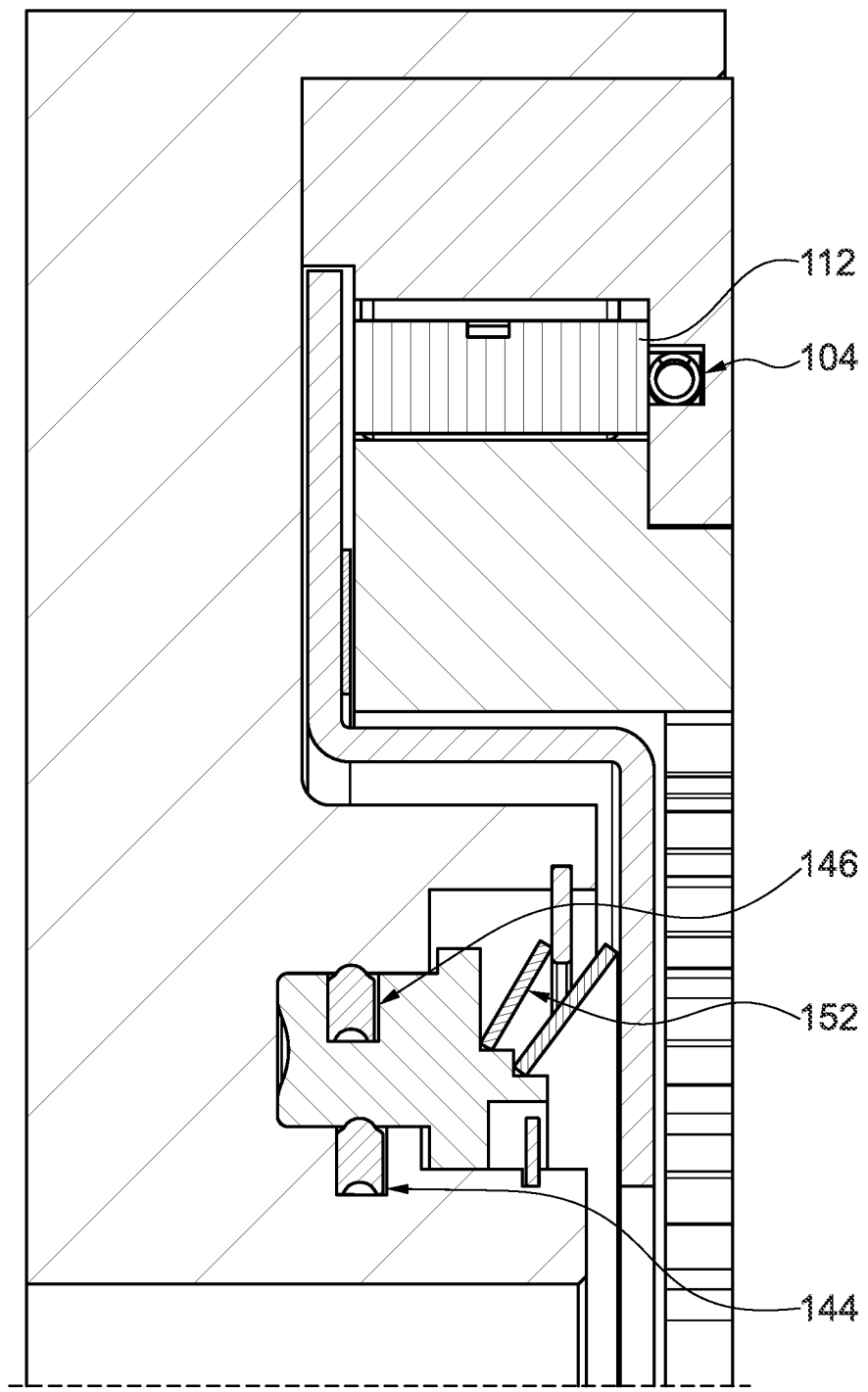
FIG. 5 is a partial section view of the clutch of FIG. 1 taken generally along line 5-5 in FIG. 1 showing an arc spring.
Figure 6:
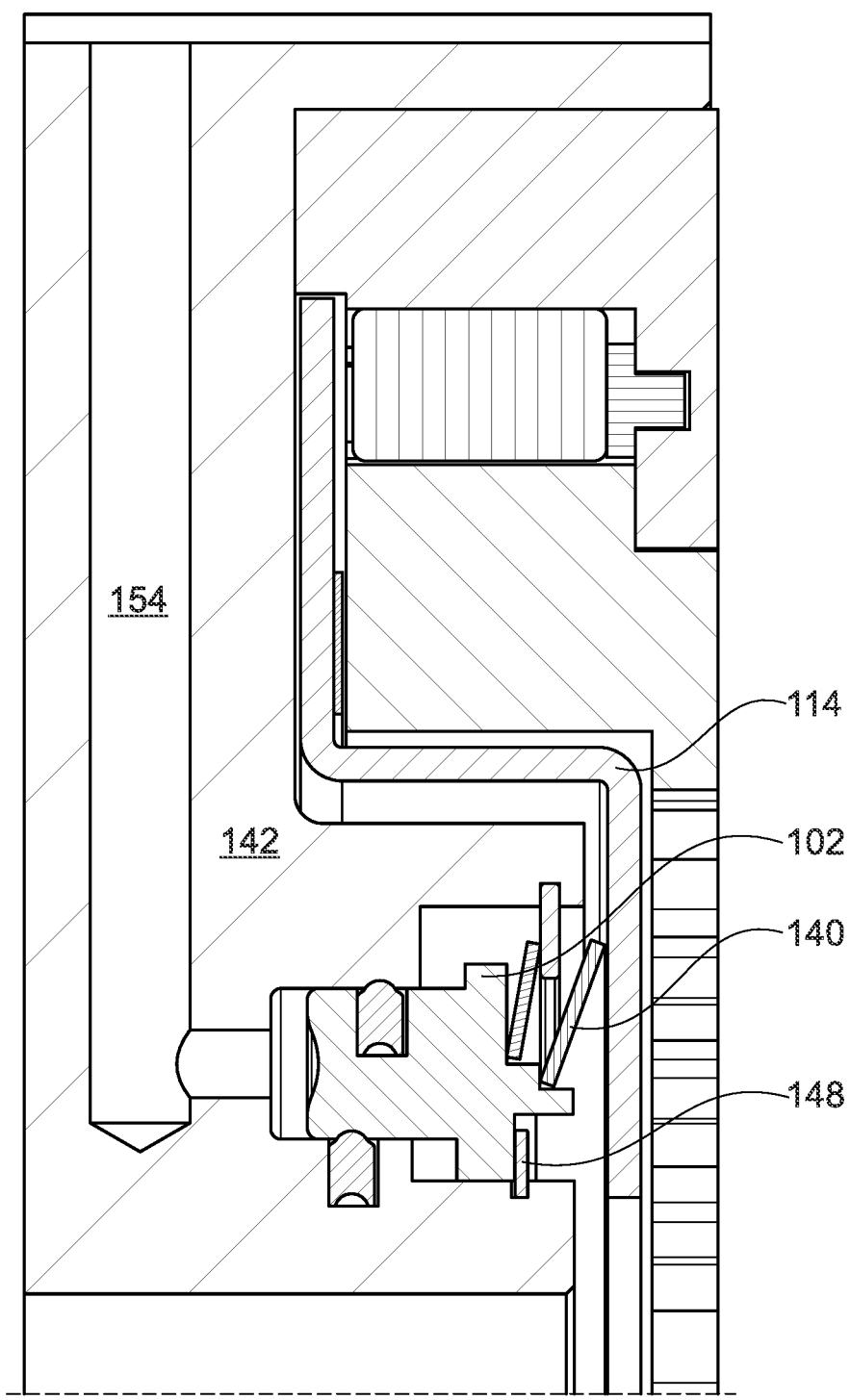
FIG. 6 is a partial section view of the clutch of FIG. 1 taken generally along line 4-4 in FIG. 1 showing a piston in an engaged state.

The following description is made with reference to FIGS. 1-6. FIG. 1 is a front perspective view of switchable one-way clutch 100 according to an example aspect. FIG. 2 is a front exploded perspective view of clutch 100. FIG. 3 is a back exploded perspective view of clutch 100. FIG. 4 is a partial section view of clutch 100 taken generally along line 4-4 in FIG. 1 showing piston 102 in a release state. FIG. 5 is a partial section view of clutch 100 taken generally along line 5-5 in FIG. 1 showing arc spring 104. FIG. 6 is a partial section view of clutch 100 taken generally along line 4-4 in FIG. 1 showing piston 102 in an engaged state.

Switchable one-way clutch 100 includes outer race 106, inner race 108, rollers 110, cage 112 and drag plate 114. Outer race 106 includes ramped inner surface 116 as is known in the art for roller one-way clutches. Surface 116 may include valley-shaped ramps, for example. Rollers 110 are contactable with the outer race and the inner race depending on an operating state of the clutch. That is, during some operation states, the rollers may contact only one or both of the inner and outer races, or they may contact neither the outer race nor the inner race. Cage 112 is for positioning the rollers. That is, the cage includes pockets 118 for locating the rollers so that they are spaced apart in a circumferential direction and can be rotated together relative to the outer and/or inner race. Cage 112 may include springs (not shown) to aid in positioning the rollers in the pockets. Drag plate 114 is rotationally engaged with the cage and frictionally engageable with the inner race as described below.

Cage 112 includes notch 122 and drag plate 114 includes tab 124 installed in the notch to engage the drag plate to the cage. That is, the drag plate and the cage are fixed to one another with regards to rotation about axis 126. Drag plate 114 includes friction material ring 128 bonded thereto for increasing a friction coefficient between the drag plate and the inner race. That is, friction material 128 has a higher coefficient of friction in oil against steel than steel on steel in oil. Ring 128 increases drag torque between the drag plate and inner race, for example. Although friction material ring is shown bonded to the drag plate, other embodiments (not shown) may include the ring bonded to the inner race.

Switchable one-way clutch 100 includes arc spring 104. As best seen in FIG. 4, outer race 106 includes pocket 130 and cage 112 includes tab 132. As best seen in FIG. 5, arc spring 104 contacts the pocket and the tab to displace the cage in rotational direction 134 (ref FIG. 2). Spring 104 urges the cage in rotational direction 134 so that, when inner race 108 rotates relative to outer race 106 in direction 134, clutch 100 locks and the inner and outer races are rotationally fixed to one another. When the inner race rotates in direction 136, opposite direction 134, clutch 100 freewheels and the inner race can rotate relative to the outer race. Inner race 108 includes inner splined surface 138 for engaging a component in a transmission, for example.

Clutch 100 includes piston 102. Piston 102 is for frictionally engaging the drag plate with the inner race to displace the cage and lock the clutch. Disk spring 140 is disposed between the piston and the drag plate. Spring 140 is uncompressed when the piston is displaced away from the drag plate (as described below) and "floats" loosely axially and tangentially and is radially retained by the piston. Clutch 100 includes housing 142. The outer race is fixed in the housing and the piston is sealed to the housing. That is, piston 102 includes seals 144 and 146 (ref. FIG. 5) creating a fluid-tite seal between the piston and the housing. Outer race 106 includes ring section 147 for retaining inner race 108 and cage 112 within the housing. That is, when the outer race is fixed in the housing (by press fitting or welding or staking, for example), the other components are retained between the housing and the outer race so that the switchable one-way clutch can be installed as a single components. Clutch 100 may be installed in a transmission, for example, and castellated tabs 149 on housing 142 can be used to rotationally fix the one-way clutch to a transmission case (not shown).

Clutch 100 includes snap ring, or retaining ring, 148 installed in the housing for limiting an axial travel of the piston towards the drag plate (ref. FIG. 6). That is, the combination of retaining ring 148 and disk spring 140 maintains a controlled force on drag plate 114 so that a hydraulic actuation pressure acting on piston 102 need not be controlled. Clutch 100 includes snap ring, or retaining ring, 150 installed in the housing and disk spring 152 contacting the piston and retaining ring 150 for displacing the piston away from the drag plate. Housing 142 includes fluid channel 154 for flowing a pressurized fluid to displace the piston towards the drag plate. Displacement of piston 102 compresses disk spring 140 against the drag plate to frictionally engage the drag plate with the inner race (ref. FIG. 6). That is, the compressed disk spring exerts a force on the drag plate. In other words, the piston is actuated by a fluid pressure and released by a disk spring (i.e., disk spring 152).

Clutch operation will now be described. For a first mode of the clutch, the inner race is rotatable relative to the outer race in a first rotational direction (i.e., direction 136 in FIG. 2) and locks to the outer race in a second opposite rotational direction (i.e., direction 134 in FIG. 2) as described above. For a second mode of the clutch, the inner race locks to the outer race in the first rotational direction and the second opposite rotational direction. Switching from the first mode of the clutch to the second mode of the clutch includes frictionally engaging the drag plate to the inner race.

Figure 7:
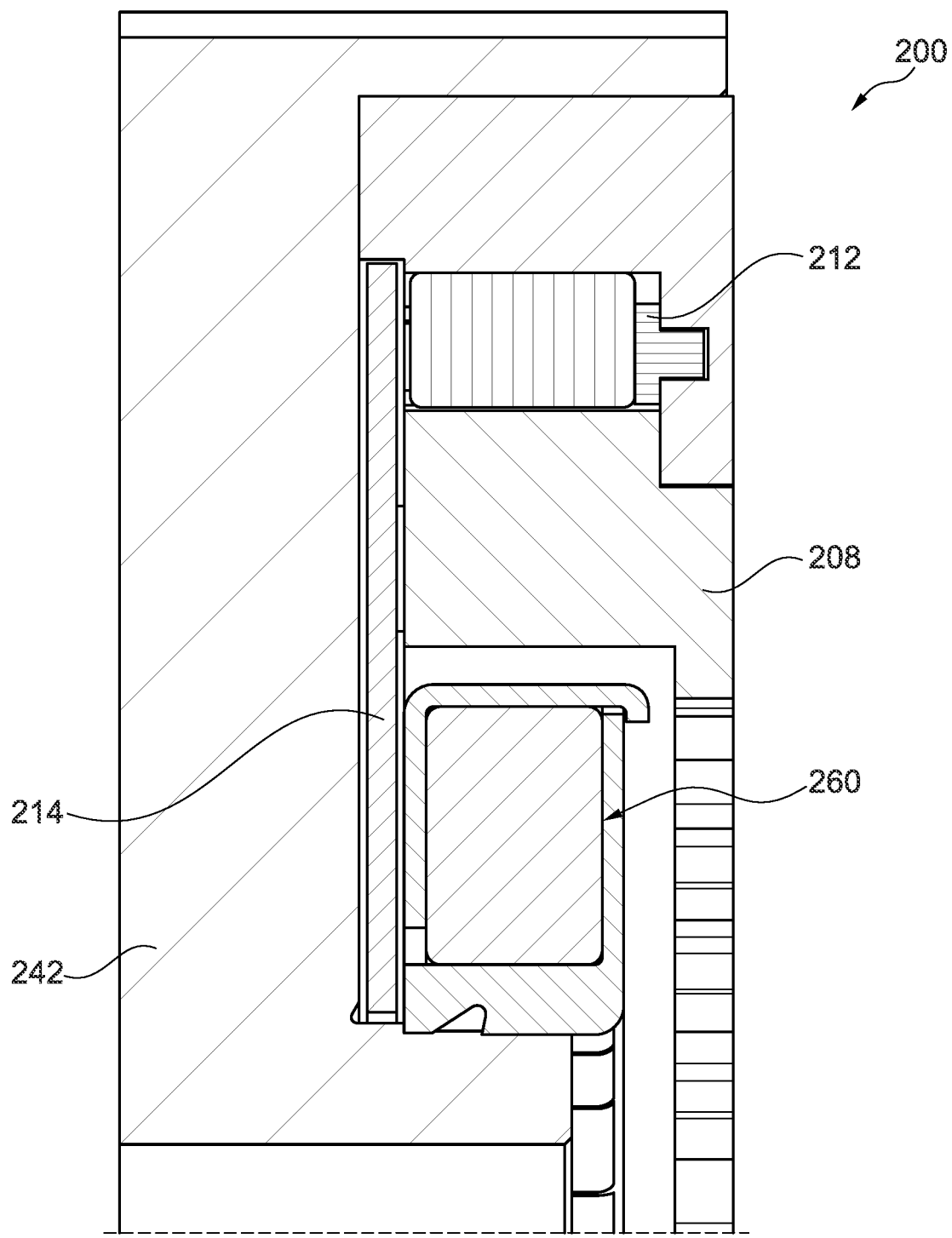
FIG. 7 is a partial section view of an alternative embodiment of the clutch of FIG. 1 including an electromagnet.

The following description is made with reference to FIG. 7. FIG. 7 is a partial section view of alternative embodiment 200 of clutch 100 of FIG. 1 including electromagnet 260 Clutch 200 is generally similar to clutch 100 and operates in a same manner except as described below. Clutch 200 includes electromagnet 260 for frictionally engaging drag plate 214 with inner race 208 to displace cage 212 in rotational direction 134 (ref. FIG. 2) to lock the clutch. That is, when the electromagnet is energized, the magnetic force pulls the drag plate towards the electromagnet, frictionally engaging the drag plate to the inner race. Electromagnet 260 is fixed to housing 242 by cutting spline 262, for example. Drag plate 214 is disposed axially between the housing and the electromagnet.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A switchable one-way clutch comprising:
    an outer race including a ramped inner surface;
    an inner race;
    a plurality of rollers contactable with the outer race and the inner race;
    a cage for positioning the plurality of rollers; and,
    a drag plate rotationally engaged with the cage and frictionally engageable with the inner race.

2. The switchable one-way clutch of claim 1 wherein the cage has a notch and the drag plate has a tab installed in the notch to engage the drag plate to the cage.

3. The switchable one-way clutch of claim 1 wherein the drag plate or the inner race includes a friction material ring bonded thereto for increasing a friction coefficient between the drag plate and the inner race.

4. The switchable one-way clutch of claim 1 further comprising an arc spring wherein:
   the outer race includes a pocket;
   the cage includes a tab; and
   the arc spring contacts the pocket and the tab to displace the cage in a first rotational direction.

5. The switchable one-way clutch of claim 1 wherein the inner race includes an inner splined surface.

6. The switchable one-way clutch of claim 1 further comprising a piston for frictionally engaging the drag plate with the inner race to displace the cage and lock the clutch.

7. The switchable one-way clutch of claim 6 further comprising a first disk spring disposed between the piston and the drag plate.

8. The switchable one-way clutch of claim 6 further comprising a housing, wherein the outer race is fixed in the housing and the piston is sealed to the housing.

9. The switchable one-way clutch of claim 8 further comprising a first retaining ring installed in the housing for limiting an axial travel of the piston towards the drag plate.

10. The switchable one-way clutch of claim 9 further comprising:
    a second retaining ring installed in the housing; and
    a second disk spring contacting the piston and the second retaining ring for displacing the piston away from the drag plate.

11. The switchable one-way clutch of claim 10 wherein:
    the housing comprises a fluid channel for flowing a pressurized fluid to displace the piston towards the drag plate; and
    displacement of the piston compresses the first disk spring against the drag plate to frictionally engage the drag plate with the inner race.

12. The switchable one-way clutch of claim 1 further comprising an electromagnet for frictionally engaging the drag plate with the inner race to displace the cage in a second rotational direction to lock the clutch.

13. The switchable one-way clutch of claim 12 further comprising a housing, wherein the electromagnet is fixed to the housing.

14. The switchable one-way clutch of claim 13 wherein the drag plate is disposed axially between the housing and the electromagnet.

15. A switchable one-way clutch assembly comprising:
    an outer race including a ramped inner surface;
    an inner race including an inner splined surface; and
    a plurality of rollers wherein:
       for a first mode of the clutch, the inner race is rotatable relative to the outer race in a first rotational direction and locks to the outer race in a second opposite rotational direction; and
       for a second mode of the clutch, the inner race locks to the outer race in the first rotational direction and the second opposite rotational direction.

16. The switchable one-way clutch assembly of claim 15 further comprising a housing wherein the outer race is fixed in the housing.

17. The switchable one-way clutch assembly of claim 15 further comprising a drag plate wherein switching from the first mode of the clutch to the second mode of the clutch includes frictionally engaging the drag plate to the inner race.

18. The switchable one-way clutch assembly of claim 17 further comprising piston for frictionally engaging the drag plate to the inner race.

19. The switchable one-way clutch assembly of claim 18 wherein the piston is actuated by a fluid pressure and released by a disk spring.

20. The switchable one-way clutch assembly of claim 17 further comprising an electromagnet for frictionally engaging the drag plate to the inner race.

* * * * *